(12) United States Patent  
Simeray et al.

(10) Patent No.: US 8,616,313 B2  
(45) Date of Patent: Dec. 31, 2013

(54) MOTORIZED TRANSPORT VEHICLE FOR A PEDESTRIAN

(76) Inventors: Marc Simeray, Paris (FR); Janick Simeray, Argenteuil (FR)

( * ) Notice: Subject to any disclaimer, the term of this patent is extended or adjusted under 35 U.S.C. 154(b) by 1080 days.

(21) Appl. No.: 12/281,101

(22) PCT Filed: Nov. 27, 2006

(86) PCT No.: PCT/FR2006/002590  
§ 371 (c)(1),  
(2), (4) Date: Jun. 24, 2009

(87) PCT Pub. No.: WO2007/060336  
PCT Pub. Date: May 31, 2007

(65) Prior Publication Data  
US 2009/0266629 A1    Oct. 29, 2009

(30) Foreign Application Priority Data

Nov. 25, 2005 (FR) ...................... 05 11982

(51) Int. Cl.  
*A63C 17/12* (2006.01)  
*A63C 17/08* (2006.01)

(52) U.S. Cl.  
USPC ................... 180/65.51; 180/181; 280/11.24; 280/205

(58) Field of Classification Search  
USPC ......... 280/11.19, 11.24, 205; 180/65.51, 181, 180/180  
See application file for complete search history.

(56) References Cited

U.S. PATENT DOCUMENTS

| | | | | | |
|---|---|---|---|---|---|
| 92,936 | A | * | 7/1869 | Brownlee | 280/11.24 |
| 430,006 | A | * | 6/1890 | Dorr | 280/11.215 |
| 572,403 | A | * | 12/1896 | Bond | 280/11.24 |
| 573,096 | A | * | 12/1896 | Marteeny | 280/11.24 |
| 1,369,849 | A | * | 3/1921 | Spencer | 280/11.24 |
| 3,330,571 | A | * | 7/1967 | Pierce | 280/11.24 |
| 4,108,451 | A | * | 8/1978 | Scheck, Sr. | 280/11.212 |
| 4,109,741 | A | * | 8/1978 | Gabriel | 180/21 |
| 4,241,931 | A | * | 12/1980 | Healy | 280/205 |
| 5,106,110 | A | * | 4/1992 | Williamson | 280/11.212 |
| 6,581,714 | B1 | * | 6/2003 | Field et al. | 180/333 |
| 7,963,352 | B2 | * | 6/2011 | Alexander | 180/21 |

FOREIGN PATENT DOCUMENTS

DE        10027466        7/2002

* cited by examiner

*Primary Examiner* — John R Olszewski  
(74) *Attorney, Agent, or Firm* — Lowe Graham Jones PLLC (57) ABSTRACT

Autonomous and lightweight vehicle intended to transport a city dweller combined with the use of public transportation. Formed by one motorized wheel on which the user maintains, through speed, his or her lateral balance, and longitudinal balance is ensured by automatic functioning driven by an accelerometer. The footrests and the guide supports that tightly hold the leg are retractable. Driving does not require the use of the hands. The entire device goes into a bag, e.g. a backpack, and weighs less than 4 kg.

3 Claims, 7 Drawing Sheets

MOTORIZED TRANSPORT VEHICLE FOR A PEDESTRIAN

PRIORITY CLAIM

This application is based on PCT Application Serial No. FR06/002590 filed Nov. 27, 2006, which claims priority to French Application Serial No. 05 11982000 filed Nov. 25, 2005, contents of which are incorporated herein.

FIELD OF THE INVENTION

This invention relates generally to the principle and embodiment of a motorized and autonomous electrical aid to help a city dweller in his or her everyday trips. City trips combine routes of all types: pedestrian routes on sidewalks, escalators, moving walkways and in elevators, city architecture such as inclined planes, stairs, footbridges, pedestrian zones; and passenger on public transportation: by train, subway, bus, streetcar and Bateau Mouche, etc.

BACKGROUND OF THE INVENTION

The user of public transportation must deal with a variety of constraints: his or her hands are full with objects to be transported, briefcase, school bags, errand items, etc. Public transportation is cramped and overcrowded; the sidewalk is busy; the stairs are narrow and steep; the public thoroughfare is governed by strict rules. After arriving at his or her destination, he or she must deal with social constraints whether at work or at school, and it can be difficult to change shoes and clothes. In addition, he or she must be able to use the aid in his or her usual attire.

It is also impossible to travel on the subway or train every day with a bicycle. It is difficult to go down stairs in roller skates; electric skateboarding are prohibited on public thoroughfares, such as a scooter; and even a vehicle such as the Segway®, designed for short-range city trips, turns out to be cumbersome on the sidewalk and not transportable on the subway and bus.

The state of the art comprises the Segway®, a platform aid comprising two wheels, rechargeable batteries, a central inertial stabilization device, and a handlebar that is integrated with the platform. This platform is not sufficiently compact to move along without difficulty on the sidewalk. It is too slow to move along on the road and, finally, its weight, in the order of 30 kg, prevents it from access to public transportation.

Patent DE 100 27 466 describes a unicycle onto which the pedestrian climbs on two pedals, rests his or her hands on a shaft that transmits the longitudinal inclination to the frame of the unicycle. An electronic device reads the longitudinal inclination of the unicycle by means of an electronic inclinometer and monitors the position of the wheel to maintain the balance of the user's center of gravity in order to prevent him or her from falling in accordance with an inverse tilt effect. The device moves forward as soon as the user inclines the shaft forward. The wheel exhibits a square shape so that the user is stable laterally. Because of this, path is guided within the longitudinal axis. The means for turning is not described, it is understood that it is necessary to briefly stand on the ground in order to convey lateral torque. Of course, turning the shaft cannot ensure rotation because the pedals and the shaft are integrated via the fork.

Patent DE 100 27 466 thus does not meet the criteria of the invention to the extent that it requires the user to hold the shaft with at least one hand, and what is more it does not permit agile and harmonious steering to the extent that only longitudinal travel is provided for. Finally, the electronic device controlling the motor is served by an inclinometer, which is a different solution than that adopted by the invention.

SUMMARY OF THE INVENTION

The invention is directed to a motorized electric aid that helps the city dweller in his or her pedestrian trips and that remains compatible with all of the constraints listed above. In a preferred embodiment, the invention abides by the following criteria: the aided pedestrian has the size of a normal pedestrian; moves along on the sidewalk at a pedestrian speed up to approximately 7 km/h and moves along on the road at a speed less than 20 km/h. The pedestrian has the agility of a normal pedestrian or skater and moves along without effort with the use of both hands and is able to wear his or her usual clothing and shoes. The aid is compact, portable, and light, for example a backpack weighs less than 4 kg has a volume less than 40 cm in diameter by 15 cm in thickness and can be recharged via a household electric socket or by another equivalent means. It offers a range of approximately one hour or 14 km.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
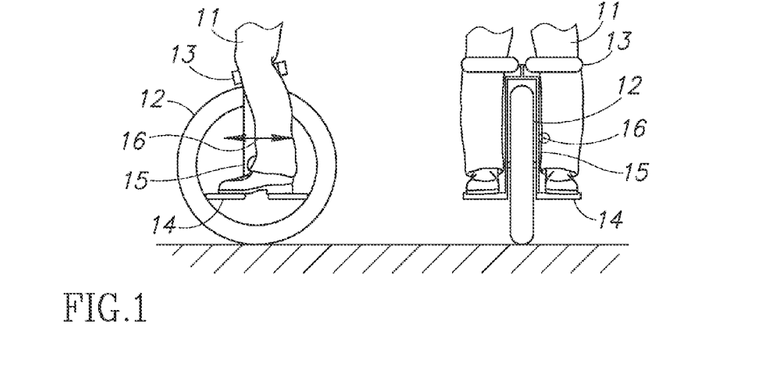
FIG. 1 illustrates a nonexclusive embodiment of the present invention.

In accordance with the invention described in FIG. 1, the user 11 moves along by standing on two footrests 14 located under the axle of a motorized wheel 12 whose axle is fitted to a fork 15 that also comprises two guide supports 13 that tightly hold the calf and the leg. The combination of the footrests 14 and the guide supports makes it possible to convey the stress and the torque of the wheel response to the leg, acting like a lever.

In accordance with the invention, the wheel is served by means of the signal sent by an accelerometer fit to the fork 15 whose longitudinal and perpendicular axis is indicated by 16. If the accelerometer reads a forward-positive on a component, then this indicates that the user is starting to fall forward, and this acceleration is used as an instruction to the wheel motor control electronics to move forward and restore balance. Balance is achieved when the accelerometer reads zero.

The conditions for this balance are better included in the user's benchmark since the effect of speed and of force acceleration is eliminated in this reference system. The fork is linked to the user's benchmark. In the preferred embodiment, the balance condition relative longitudinal acceleration relative to zero is then always true, no matter the speed and force acceleration.

The preferred servocontrol electronics in accordance with the invention are described as follows. For leg inclination of approximately 10° to the front that produces relative acceleration of approximately 1.7 m/sec² in the user's benchmark, the electronics activate the motor's full power, allowing the maximum speed. Motor control is linear proportionally for all of the intermediate values and also benefits from critical shock absorption to avoid the risk of vibration of the wheel under the user because of the strong power of the motorized vehicle.

In accordance with a variant not exclusive to the invention, an inclination of 10° to the back activates either backward movement of the wheel at full power or braking. In accordance with this variant of the invention, braking is accompanied by recovery of power, which is passed back into the battery. This principle of operation will be explained in detail after the description.

Figure 2:
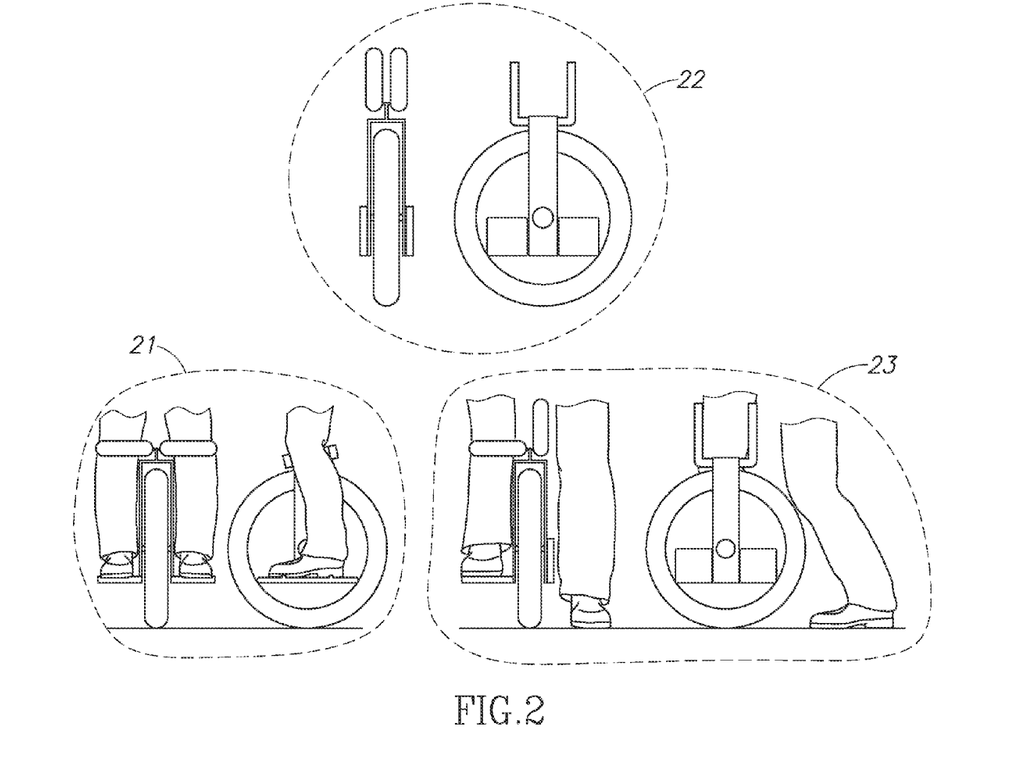
FIG. 2 illustrates different perspectives of a nonexclusive embodiment of the present invention.

FIG. 2 indicates the different positions of the invention. In 21 the invention moves the user balancing on the two footrests. The user is kept in longitudinal balance by the effect of the servocontrol electronics; he or she has nothing else to manage than lateral balance, exactly as he or she does after training on a bicycle. Rotation is activated by an inclination of the body to the side, or the user wants to turn and by movement of the shoulder to reset the course exactly the way this is done on a bicycle when the handlebars are let go.

In 22, the footrests are folded down as are the guide supports, and in this position the electronics are disconnected, and the invention is in storage mode such that it can be put into a backpack, for example. In this position, the folded guide supports can be used as a handle, for example.

In 23, the user has just decelerated and braked by inclining backward, or is about to start going. In this position, one foot is inserted onto the footrest, and the wheel keeps the fork vertical. To start going again, it is sufficient to incline the footrest leg forward and to launch with the other leg to then position it on the other footrest by folding it back and finding balance thanks to the initial speed.

In accordance with the invention, the wheel's servocontrol is connected as soon as both feet are in a footrest, either the right or the left. In the preferred embodiment, servocontrol is disconnected when both feet have left the footrests.

Figure 3:
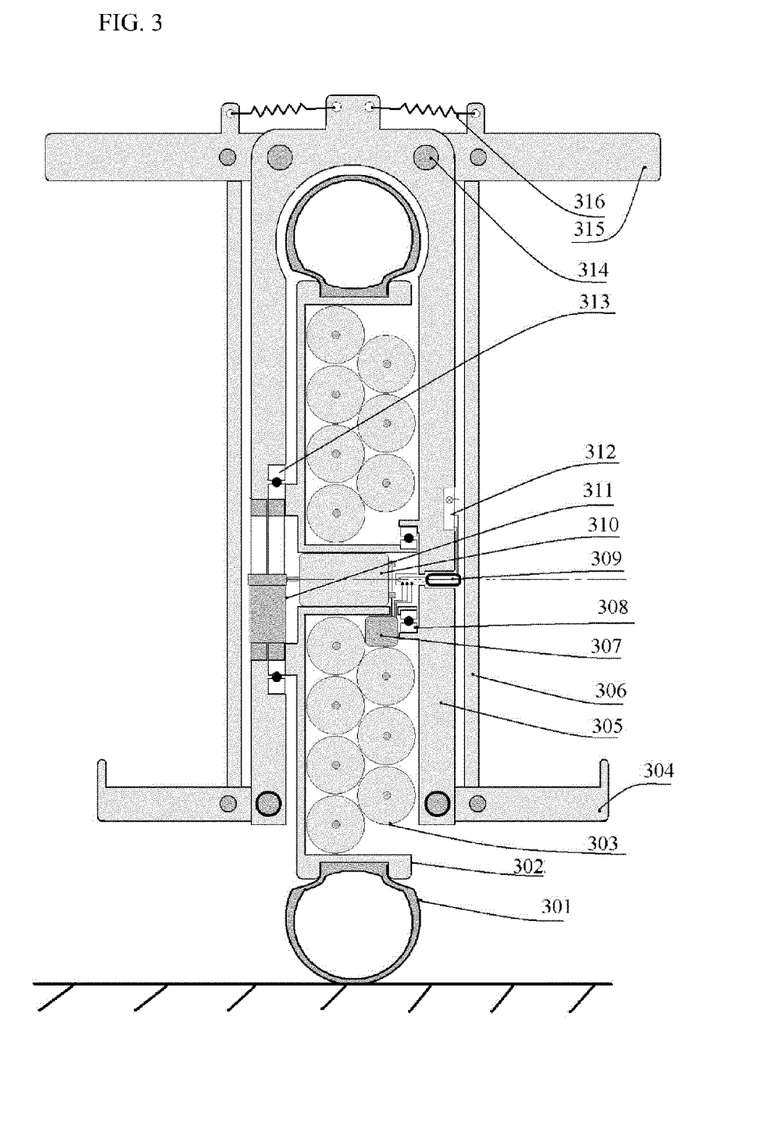
FIG. 3 illustrates a nonexclusive embodiment of the present invention.

FIG. 3 describes a nonexclusive embodiment example of the invention. It comprises a tire 301 in a rim 302. The tire can also be an elastomer tread. Rechargeable batteries 303, regardless of their technology, are positioned in the wheel, for example, nickel cadmium, nickel-metal hydride, lithium ion, lithium ion polymer, or finally an ethanol or methanol fuel cell. Switched-mode power switching electronics 307 govern the power of the motor 310. The footrest 304 is fit to the fork 305 and is connected back to the support back 315 by means of a rod 306. The spring 316 returns the footrest 304 and the guide 315 to the up position in the absence of a foot, thanks to the pivot 314.

When the footrest folds down, a connector that is not shown opens, and it breaks the power supply from the electronics to the motor control. Each footrest has a one connector, and both connectors are connected back to the power supply circuit in series.

The wheel is connected back to the fork 305 by means of ball bearings 308 and 313. The motor 310 located in the wheel axle is linked with a reducer 311, e.g. a harmonic type, the detail of which is explained in FIG. 4.

In accordance with the invention, the reducer can also be realized from a cogwheel chain, or more usually with the latter driving the wheel on the rim 302. In accordance with the invention, the motor 310 is a linear or even brushless (no brush) type. In this latter case, it is linked with a driver 307 adapted to the brushless motor control.

In accordance with the invention, the information delivered by the accelerometer and its integrated processing 312 of the fork 305 is transmitted by a turning-type connector 309 or even by a simple audio jack connector. Passed through this connector are the sensor power supply, the motor control PWM signal, and the ground, for example, or even a second signal of the ground is passed through the frame.

Figure 4:
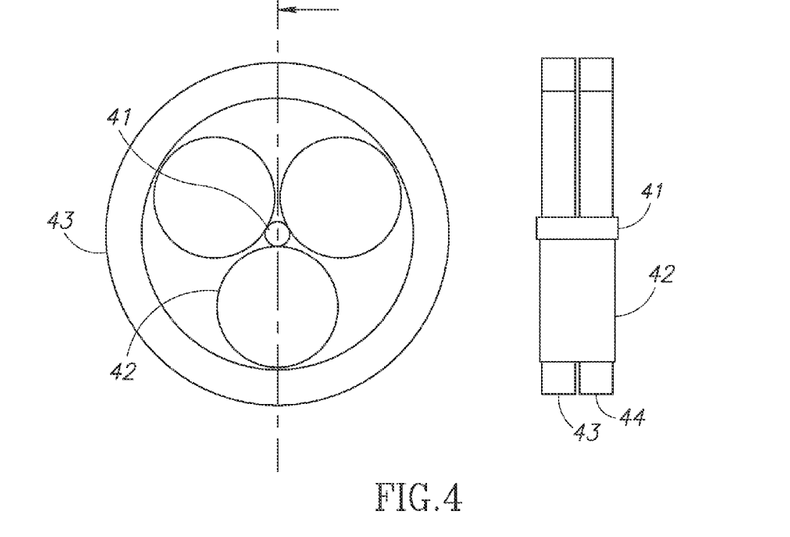
FIG. 4 illustrates a nonexclusive embodiment of the present invention.

FIG. 4 describes an embodiment example of a simple and cost-effective harmonic reducer for a high rpm brushless motor. In 42 it comprises an integrated cogwheel of the motor shaft, e.g. with 20 cogs. It comprises 3 other gearwheel 42 greater in diameter, e.g. with 100 teeth each, all three being distributed at 120° around the motor gearwheel. Finally, it comprises two side-by-side exterior crown wheels 43 and 44, where 43 has 240 teeth and 44 has 243 teeth, for example.

The full turn of a gearwheel 43 moves a crown wheel 43 by 3 teeth in relation to 44, or 3/240 turns. 12 turns are necessary on 41 so that 42 makes a full turn; thus, the reduction ratio is 3/(240×12), or 960. This describes an embodiment example of a strong ratio reducer as made necessary by using increasingly higher-power high-rpm motors.

Figure 5:
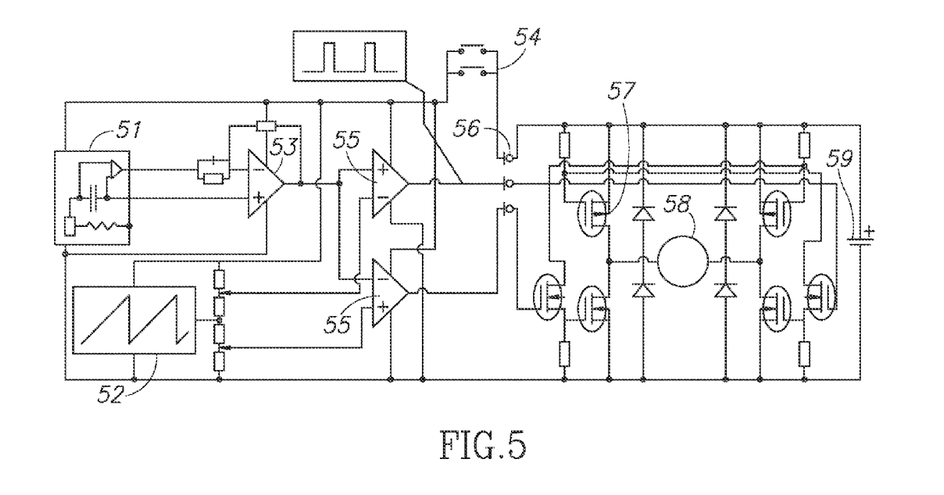
FIG. 5 illustrates a nonexclusive embodiment of the motor control and servocontrol electronics of the present invention.

FIG. 5 gives an embodiment example of the motor's control and servocontrol electronics. It comprises an integrated accelerometer 51, suspended internal lead silicon type, connected with a capacitor and a capacity measurement circuit. This sensor delivers a variable output voltage according to the acceleration, where zero acceleration corresponds to half-power voltage. It comprises an amplifier active filter 53 whose static gain is governed by the ratio of the two resistors and the absorption frequency and by the ratio between the capacitor capacity and the feedback resistor.

Finally, a triangular voltage generator 52, realized from a current and capacitor generator, for example, linked with a comparator 55, forms a variable PWM signal for motor control by respecting the proportionality and linearity of the output of 53.

In the drawing, two PWM controls are indicated, where one corresponds to forward motor control and the other to reverse motor control. The switch 54 breaks the circuit when both feet have left the footrests. The turning connector 56 transmits the commands and power supply. The MOS-transistor control bridge 57 in accordance with the state of the art transmits to the motor 58 a power proportional to the signal processed by 53.

In accordance with the invention, power is delivered by the batteries 59, but when there is braking power is also returned to the batteries 59 by means of the diode bridge of 57. In accordance with one embodiment example of the invention, the result is obtainable with various components:

The accelerometer 51 in FIG. 5 and 61 in FIG. 1 and 312 in FIG. 3 is an ADXL103 Analog Device®; the brushless motor is e.g. Cyclon Car 2000 from the Cyclon® Company, which delivers 1 kW at 40,000 rpm. The motor driver is Flash Pro Car 1000 from the same company; the reducer is HDUC14 from the Harmonic Drive® Company; batteries are polymer lithium ion batteries from various suppliers; the fork and wheel are implemented in aluminum. In accordance with this embodiment, it is verified that the pedestrian aided by the invention exhibits the size of a normal pedestrian; moves along on the sidewalk at a pedestrian speed up to approximately 7 km/h; moves along on the road at a speed less than 20 km/h; has the agility of a normal pedestrian or skater; moves along without effort; has the use of both hands; wears his or her usual clothing and shoes.

The preferred embodiment of the present invention is compact, portable, and light, for example in a backpack; weighs less than 4 kg has a volume less than 40 cm in diameter by 15 cm in thickness; is rechargeable on a household electric socket by means of a charger adapted to the type of batteries, or thanks to the addition of fuel for a fuel cell; offers a range of approximately one hour, or 14 km.

The ergonomics and steering of the invention are intuitive and do not require the use of the hands by means of two guide supports 13, 315 that tightly hold the user's legs and transmit torque; a motor type 310 that keeps the wheel perpendicular to the center of gravity of the city dweller by means of steering electronics 307 of the motor controlled linearly by an integrated longitudinal accelerometer 16 on the fork. Its startup is intuitive and automatic by means of two power supply switches on the aforesaid electronics that are activated by the weight of the feet on the two aforesaid footrests. Its lateral steering is agile by means of a wheel 302 whose narrow tread 301 is approximately round in shape.

The invention is easy to transport by means of a bag or handle and storage made compact by the two footrests 304 and two retractable support guides 315 connected with a rod 306.

Figure 6:
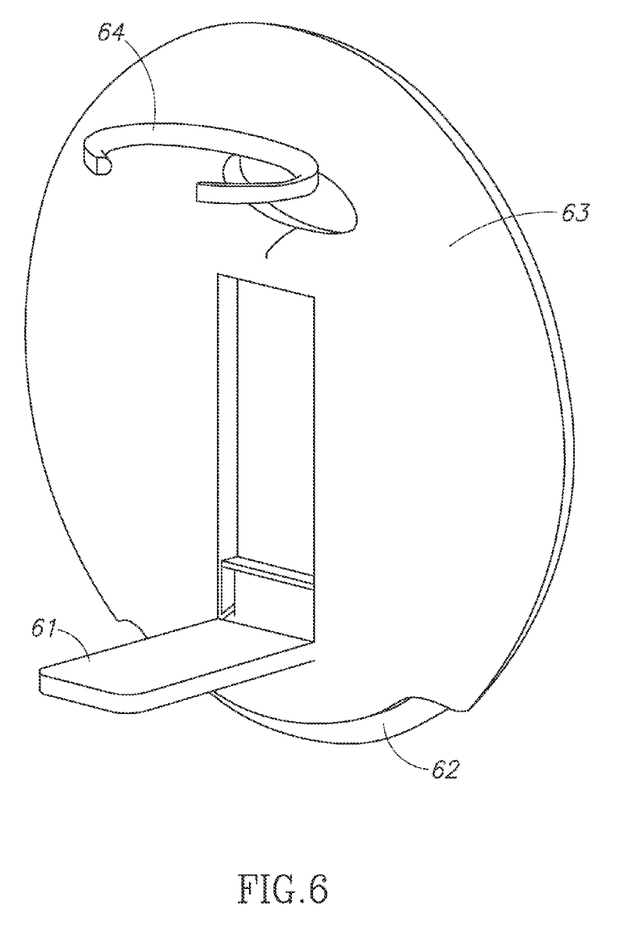
FIG. 6 illustrates a nonexclusive embodiment of the pedals of the present invention.

Another embodiment example of the invention is described below. Its object is to solve the problems presented by the preceding implementation, the resistance of the load and impact pivots, and the problems of intrinsic inertia of the wheel that penalize its responsiveness for servocontrol of balance. Like the preceding one, this embodiment in FIG. 6 comprises retractable pedals 61, a tread 62, a guard 63, and a guide clip 64.

Figure 7:
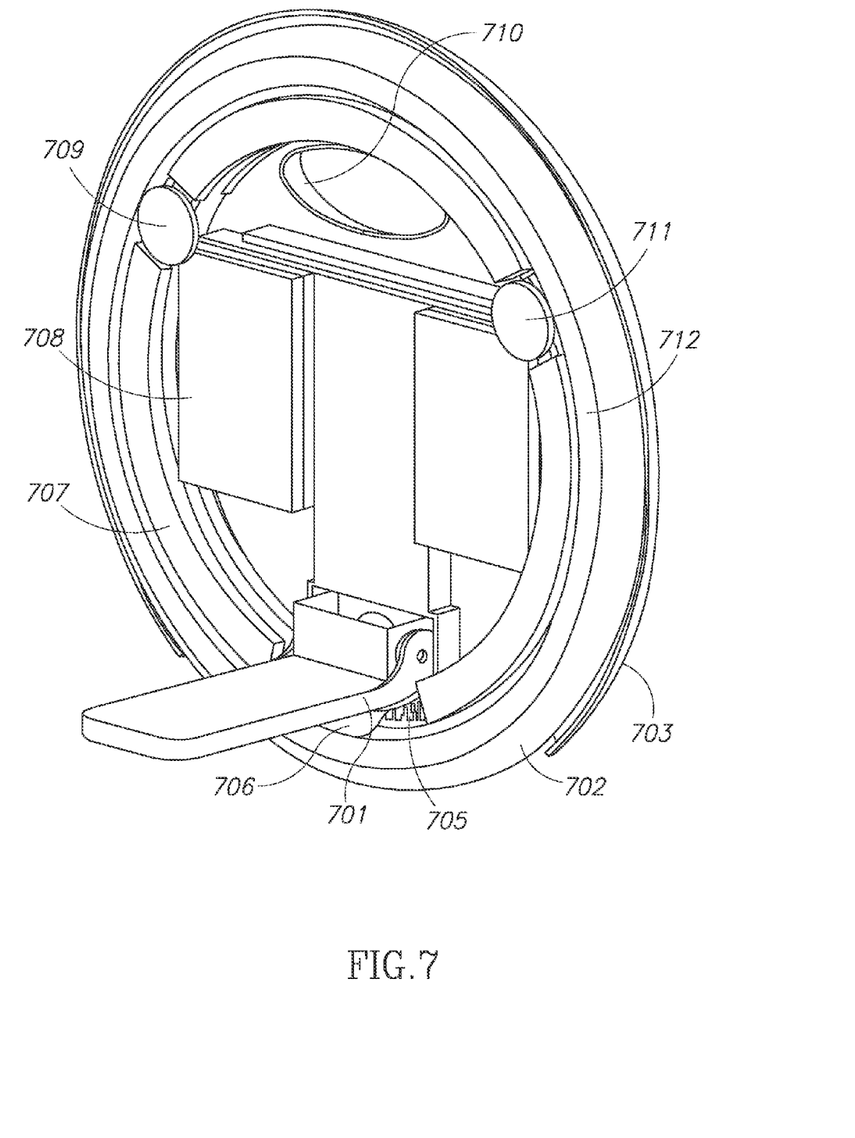
FIG. 7 illustrates a nonexclusive embodiment of the pedals of the present invention.

FIG. 7 details this embodiment 701, 702, and 703, respectively, the pedals, the tread, and the guard; in 705, the integrated magnets of a rim 712; a roller 706; supported on the aforesaid rim 712, a coil 707 that realizes torque in combination with 705 powered by electronics that are not shown and batteries 708. The two other rollers 709 and 711 guide the hollow wheel, and a handle is found in 710.

Figure 8:
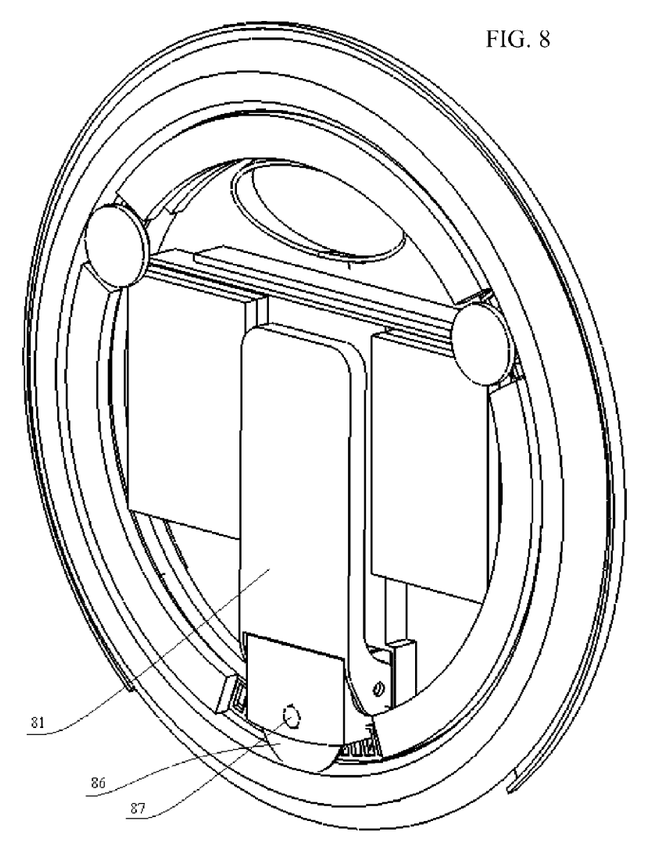
FIG. 8 illustrates a nonexclusive embodiment of the pedals of the present invention.

FIG. 8 shows the retracted pedal 81, the roller 86, and its hubs mounted on ball bearings. Through this embodiment, the user's weight is borne directly by the pedals, transmitted to the hubs 87 and to the rim 712 and to the tread 702. This direct transmission of stress without loading or torsion justifies lightweight materials. The tread is not deformed by the stress carried. The two other rollers 709 and 711 only guide the wheel without sustaining stress. Motivity is ensured by a linear motor 707 without transmission friction and with the possibility of being able to recover kinetic power in the batteries.

Figure 9:
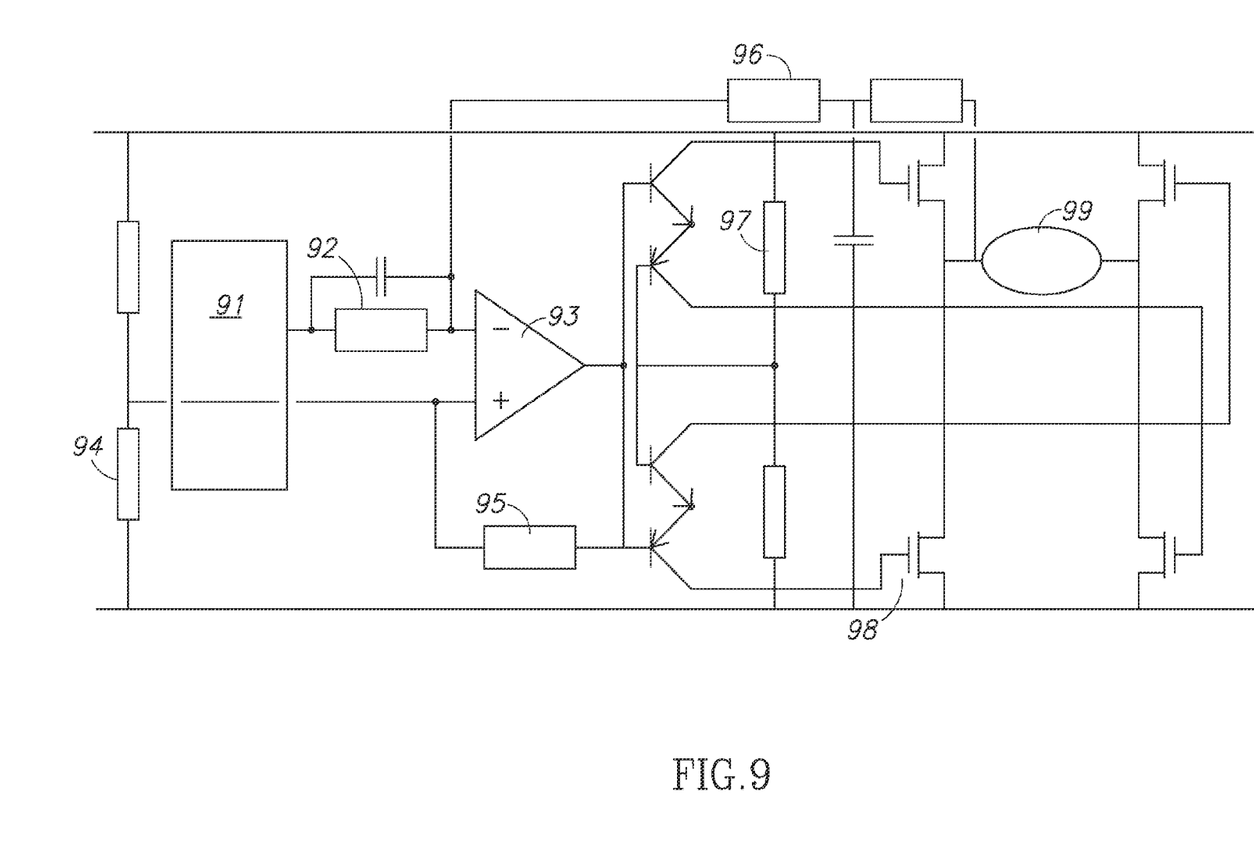
FIG. 9 illustrates a nonexclusive embodiment of the control electronics of the present invention.

The control electronics of this motor are summarized in FIG. 9. As in the original implementation, it comprises a random PWM switching method based on the performance of comparator of linear amplifier, high frequency only.

The accelerometric sensor 91 delivers a signal proportional to the acceleration. The goal of the action of the motor is to keep this measured acceleration constant and zero by means of a diverter filter 92 that introduces absorption compensation, by means of a reference 94, by means of an amplifier 93 and reaction 95, by means of a bridge in H 98 that powers the motor 99 and, finally, by means of rejection feedback 96 for frequencies greater than 100 Hz. According to this principle, the amplifier output is permanently dynamic at a frequency greater than 100 Hz by combined action of the reaction and slower feedback. In this way, the motor is controlled in accordance with a linear function of acceleration and its derivative from a variable PWM signal.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. Autonomous electric mobile aid intended to transport a city dweller comprising: a single wheel, an electric motor, a battery, a fork, and two footrests characterized in that the ergonomics and driving of it are intuitive and do not require the use of the hands by means of:
   two combined supports secured to the fork on either side of the wheel that are each configured to operate as a lever to convey stress and torque of the wheel response to a leg of the user;
   the motor being of the type that keeps the wheel directly under the center of gravity of the average city dweller;
   a driving electronics of the motor controlled linearly by a balance sensor on the fork;
   wherein lateral steering is agile by means of the single wheel having a tread that is approximately round in shape in a plane parallel to an axis of rotation of the single wheel; and
   wherein it is compact when carried by the city dweller by means of the two footrests being foldable.

2. The mobile aid of claim 1, further comprising two retractable support guides coupled to the fork; wherein the two footrests and the two retractable support guides are connected with a rod.

3. The mobile aid of claim 1, wherein the balance sensor is an integrated longitudinal accelerometer.

* * * * *